(12) United States Patent
Tsuge et al.

(10) Patent No.: US 10,707,507 B2
(45) Date of Patent: Jul. 7, 2020

(54) METHOD OF INSPECTING OUTPUT OF FUEL CELL

(71) Applicant: HONDA MOTOR CO., LTD., Minato-ku, Tokyo (JP)

(72) Inventors: Hodaka Tsuge, Tochigi-ken (JP); Koichiro Sato, Tochigi-ken (JP); Tadaaki Yamada, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 16/140,765

(22) Filed: Sep. 25, 2018

(65) Prior Publication Data

US 2019/0103619 A1   Apr. 4, 2019

(30) Foreign Application Priority Data

Sep. 29, 2017   (JP) .................... 2017-192063

(51) Int. Cl.
  *H01M 8/04537*  (2016.01)
  *H01M 8/04858*  (2016.01)
  *H01M 4/92*  (2006.01)
  *H01M 8/1004*  (2016.01)
  *H01M 8/04746*  (2016.01)

(52) U.S. Cl.
  CPC ....... *H01M 8/04619* (2013.01); *H01M 4/926* (2013.01); *H01M 8/0488* (2013.01); *H01M 8/0491* (2013.01); *H01M 8/04753* (2013.01); *H01M 8/1004* (2013.01)

(58) Field of Classification Search
  CPC .................. H01M 8/04619; H01M 8/04552
  See application file for complete search history.

(56) References Cited

U.S. PATENT DOCUMENTS

| 8,906,568 | B2* | 12/2014 | Jeong | H01M 8/04313 429/431 |
| 2003/0184307 | A1* | 10/2003 | Kozlowski | B60L 3/0046 324/427 |
| 2004/0091759 | A1* | 5/2004 | Harrington | H01M 8/04119 429/431 |
| 2006/0078788 | A1* | 4/2006 | Ramschak | H01M 8/04559 429/90 |
| 2015/0153418 | A1* | 6/2015 | Prenninger | H01M 8/04992 702/63 |

FOREIGN PATENT DOCUMENTS

JP   2011-028965   2/2011

* cited by examiner

*Primary Examiner* — Matthew J Merkling
(74) *Attorney, Agent, or Firm* — Amin, Turocy & Watson, LLP (57) ABSTRACT

In an electric potential difference forming step of a method of inspecting output of a fuel cell, a hydrogen gas as an anode gas is supplied to an anode, and an inert gas as a cathode gas is supplied to the cathode to generate an electric potential difference between the anode and the cathode. In a maintaining step, measurement current which is smaller than rated current of the fuel cell is applied to the anode and the cathode, and the voltage between the anode and the cathode is maintained at less than the reduction potential of the electrode catalyst. In a measurement step, in the state where the measurement current is applied to the anode and the cathode, and voltage between the anode and the cathode is maintained, the cathode gas is changed to a mixed gas, and then, output of the fuel cell is measured.

2 Claims, 5 Drawing Sheets

FIG. 2

| NUMBER OF TIMES | EMBODIMENT EXAMPLE | | | | COMPARATIVE EXAMPLE (ONLY MEASUREMENT STEP) |
|---|---|---|---|---|---|
| | 1-1 (MAINTAINING TIME: 0.5 MIN) | 1-2 (MAINTAINING TIME: 1 MIN) | 1-3 (MAINTAINING TIME: 5 MIN) | 1-4 (MAINTAINING TIME: 10 MIN) | |
| 1 | 1.0031 | 1.0032 | 1.0032 | 1.0053 | 0.9963 |
| 2 | 1.0031 | 1.0033 | 0.9997 | 1.0008 | 1.0048 |
| 3 | 1.0043 | 1.0014 | 1.0019 | 0.9995 | 0.9865 |
| 4 | 1.0029 | 1.0004 | 0.9988 | 0.9998 | 0.9989 |
| 5 | 0.9987 | 1.0022 | 0.9959 | 1.0014 | 1.0114 |
| 6 | 0.9992 | 1.0003 | 1.0037 | 1.0013 | 0.9941 |
| 7 | 0.9982 | 0.9966 | 1.0016 | 0.9993 | 1.0016 |
| 8 | 0.9983 | 1.0000 | 0.9958 | 0.9996 | 1.0022 |
| 9 | 0.9963 | 0.9979 | 0.9993 | 0.9967 | 1.0054 |
| 10 | 0.9959 | 0.9947 | 1.0000 | 0.9964 | 0.9988 |
| STANDARD DEVIATION | 0.003075 | 0.002833 | 0.002720 | 0.002520 | 0.006855 |
| AVERAGE | 1.00000 | 1.00000 | 0.99999 | 1.00001 | 1.00000 |

| NUMBER OF TIMES | EMBODIMENT EXAMPLE ||||| COMPARATIVE EXAMPLE (ONLY MEASUREMENT STEP) |
| | 2-1 (NUMBER OF CYCLES IS 1) | 2-2 (NUMBER OF CYCLES IS 2) | 2-3 (NUMBER OF CYCLES IS 3) | 2-4 (NUMBER OF CYCLES IS 4) | 2-5 (NUMBER OF CYCLES IS 5) | |
|---|---|---|---|---|---|---|
| 1 | 1.0024 | 1.0045 | 1.0016 | 1.0025 | 1.0005 | 0.9963 |
| 2 | 1.0026 | 1.0014 | 1.0012 | 1.0004 | 1.0033 | 1.0048 |
| 3 | 1.0004 | 1.0026 | 1.0026 | 1.0027 | 1.0026 | 0.9865 |
| 4 | 1.0023 | 0.9994 | 1.0025 | 1.0016 | 0.9982 | 0.9989 |
| 5 | 1.0000 | 0.9992 | 0.9995 | 0.9993 | 1.0016 | 1.0114 |
| 6 | 1.0000 | 0.9998 | 0.9979 | 1.0006 | 1.0005 | 0.9941 |
| 7 | 1.0013 | 0.9993 | 1.0006 | 0.9998 | 1.0000 | 1.0016 |
| 8 | 0.9984 | 0.9981 | 0.9998 | 0.9987 | 0.9987 | 1.0022 |
| 9 | 0.9967 | 0.9986 | 0.9993 | 0.9992 | 0.9984 | 1.0054 |
| 10 | 0.9960 | 0.9971 | 0.9950 | 0.9951 | 0.9963 | 0.9988 |
| STANDARD DEVIATION | 0.002336 | 0.002223 | 0.002299 | 0.002198 | 0.002157 | 0.006855 |
| AVERAGE | 1.00001 | 1.00000 | 1.00000 | 0.99999 | 1.00001 | 1.00000 |

FIG. 5

METHOD OF INSPECTING OUTPUT OF FUEL CELL

CROSS-REFERENCE TO RELATED APPLICATION

This application is based upon and claims the benefit of priority from Japanese Patent Application No. 2017-192063 filed on Sep. 29, 2017, the contents of which are incorporated herein by reference.

BACKGROUND OF THE INVENTION

Field of the Invention

The present invention relates to a method of inspecting output of a fuel cell. The fuel cell includes an electrolyte membrane of solid polymer, an anode provided on one surface of the electrolyte membrane, and a cathode provided on the other surface of the electrolyte membrane.

Description of the Related Art

Fuel cells having an anode on one surface of an electrolyte membrane of solid polymer, and a cathode on the other surface of the electrolyte membrane are known. As a method of inspecting output of a fuel cell of this type, for example, Japanese Laid-Open Patent Publication No. 2011-028965 proposes to apply energizing current which is equal to rated current in actual power generation between the anode and the cathode, and based on whether or not the obtained output is not less than a reference value, determine the presence/absence of abnormality.

SUMMARY OF THE INVENTION

In the above output inspection method, an apparatus in large scale or large quantities of the fuel gas and the oxygen-containing gas are required for applying large energizing current which is equal to the rated current, between the electrodes. Therefore, large cost is required for output inspection.

However, if energizing current which is smaller than rated current is simply applied between the electrodes at time of output inspection in order to reduce the cost required for output inspection, variation in results of output inspection tends to occur easily, and the desired accuracy of the output inspection may not be achieved.

A main object of the present invention is to provide a method of inspecting output of a fuel cell in which it is possible to measure output of the fuel cell at low cost and highly accurately.

In the case where small energizing current is applied between the electrodes at the time of output inspection, the desired accuracy of output inspection may not be achieved. With regard to the cause of this point, as a result of intensive studies of the inventors of the present application, the following findings have been obtained. Specifically, if large energizing current equal to the rated current is applied between the electrodes, it is possible to decrease the voltage applied between the electrodes to be significantly lower than the reduction potential of the electrode catalyst. For this reason, even if variation is present in the oxidation reduction state of the electrode catalyst before measurement of output of the fuel cell, by applying the large energizing current between the electrodes afterward, so as to measure the output of the fuel cell, it is possible to suppress or eliminate variation of the oxidation state. As a result, it is possible to suppress variation in measurement results of output of the fuel cell due to the influence of the oxidation reduction state of the electrode catalyst.

On the other hand, if small energizing current is applied between the electrode, since the voltage applied between the electrodes becomes large, in the case where variation is present in the oxidation reduction state of the electrode catalyst before measurement of output of the fuel cell, it follows that output inspection is performed in the presence of variation in the oxidation reduction state. As a result, variation tends to occur easily in the measurement results of the output of the fuel cell as well, due to the influence of variation in the oxidation reduction state of the electrode catalyst. Therefore, the desired accuracy of output inspection may not be achieved.

In view of the above, according to an embodiment of the present invention, a method of inspecting output of a fuel cell is provided. The fuel cell includes an electrolyte membrane of solid polymer, an anode provided on one surface of the electrolyte membrane, and a cathode provided on another surface of the electrolyte membrane. Each of the anode and the cathode includes electrode catalyst. The method includes an electric potential difference forming step of generating an electric potential difference between the anode and the cathode by supplying a hydrogen gas as an anode gas to the anode and supplying an inert gas as a cathode gas to the cathode, a maintaining step of applying measurement current which is smaller than rated current of the fuel cell to the anode and the cathode having the electric potential difference, and maintaining voltage between the anode and the cathode at less than a reduction potential of the electrode catalyst, and a measurement step of, in a state where the measurement current is applied to the anode and the cathode, and voltage between the anode and the cathode is maintained at less than the reduction potential of the electrode catalyst, changing the cathode gas supplied to the cathode to a mixed gas of the inert gas and an oxygen-containing gas, and thereafter, measuring output of the fuel cell.

In the electric potential difference forming step in the method of inspecting output of the fuel cell, a hydrogen concentration difference between the anode to which the hydrogen gas has been supplied and the cathode to which the inert gas has been supplied is utilized to make it possible to generate an electric potential difference between the anode and the cathode. By performing the maintaining step of applying small measurement current as energizing current which is smaller than the rated current to the anode and the cathode having the electric potential difference, and maintaining the voltage (electric potential difference) between the anode and the cathode at less than the reduction potential of the electrode catalyst, it becomes possible to apply reduction treatment to the electrode catalyst. Thus, it is possible to suppress or eliminate variation in the oxidation reduction state of the electrode catalyst.

Further, in the measurement step, in the state where the measurement current as energizing current is applied to the anode and the cathode and voltage between the anode and the cathode is maintained at less than the reduction potential of the electrode catalyst, the cathode gas supplied to the cathode is changed to a mixed gas of the inert gas and an oxygen-containing gas. In this manner, by inducing power generation reactions at the anode and the cathode, the voltage measured by applying measurement current as energizing current which is smaller than the rated current between the anode and the cathode can be obtained as a measurement result of output of the fuel cell. Further, since the mixed gas is supplied to the cathode, in comparison with the case where only the oxygen-containing gas is supplied to the cathode, it is possible to reduce the quantity of the hydrogen gas consumed in the power generation reaction.

Thanks to these advantages, it is not required to provide an apparatus in large scale or large quantities of the hydrogen gas, etc. for applying large energizing current which is as large as the rated current, to the anode and the cathode. For this reason, with the simple structure, it becomes possible to perform output inspection of the stack at low cost.

Further, since the cathode gas is used as the mixed gas, in comparison with the case where only the oxygen-containing gas is used as the cathode gas, it is possible to easily maintain the voltage between the anode and the cathode gas at less than the reduction potential of the electrode catalyst. As described above, by performing the measurement step while maintaining the voltage between the anode and the cathode at less than the reduction potential of the electrode catalyst, it is possible to obtain the measurement result of the output of the fuel cell while variation in the oxidation reduction state of the electrode catalyst is kept reduced or eliminated by the electric potential difference forming step and the maintaining step.

Therefore, the measuring current which is smaller than the rated current is the energizing current applied to the anode and the cathode, even in the case where the voltage between the anode and the cathode is not small enough to eliminate variation in the oxidation reduction state of the electrode catalyst, it is possible to effectively suppress variation in the measurement result of the output. Consequently, it becomes possible to perform output inspection of the fuel cell at low cost highly accurately.

Preferably, the method of inspecting output of the fuel cell may further include a voltage application step of applying cyclic voltage to the fuel cell after the electric potential difference forming step and before the maintaining step, in a state where the electric potential difference is generated between the cathode and the anode and the cyclic voltage is increased and decreased within a predetermined range having a minimum voltage less than the reduction potential of the electrode catalyst, and the maintaining step is performed after stopping application of the voltage in the voltage application step.

In this case, in the voltage application step, by applying the cyclic voltage between the anode and the cathode utilizing the electric potential difference generated in the electric potential difference forming step, it is possible to apply reduction treatment to the electrode catalyst. By performing the maintaining step after performing this voltage application step, it is possible to suppress or eliminate variation of the oxidation reduction state of the electrode catalyst effectively to a greater extent. Consequently, in the measurement step, it becomes possible to obtain the measurement result of the output of the fuel cell with a higher degree of accuracy.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of a method of inspecting output of a fuel cell according to the present invention will be described in detail with reference to the accompanying drawings.

Figure 1:
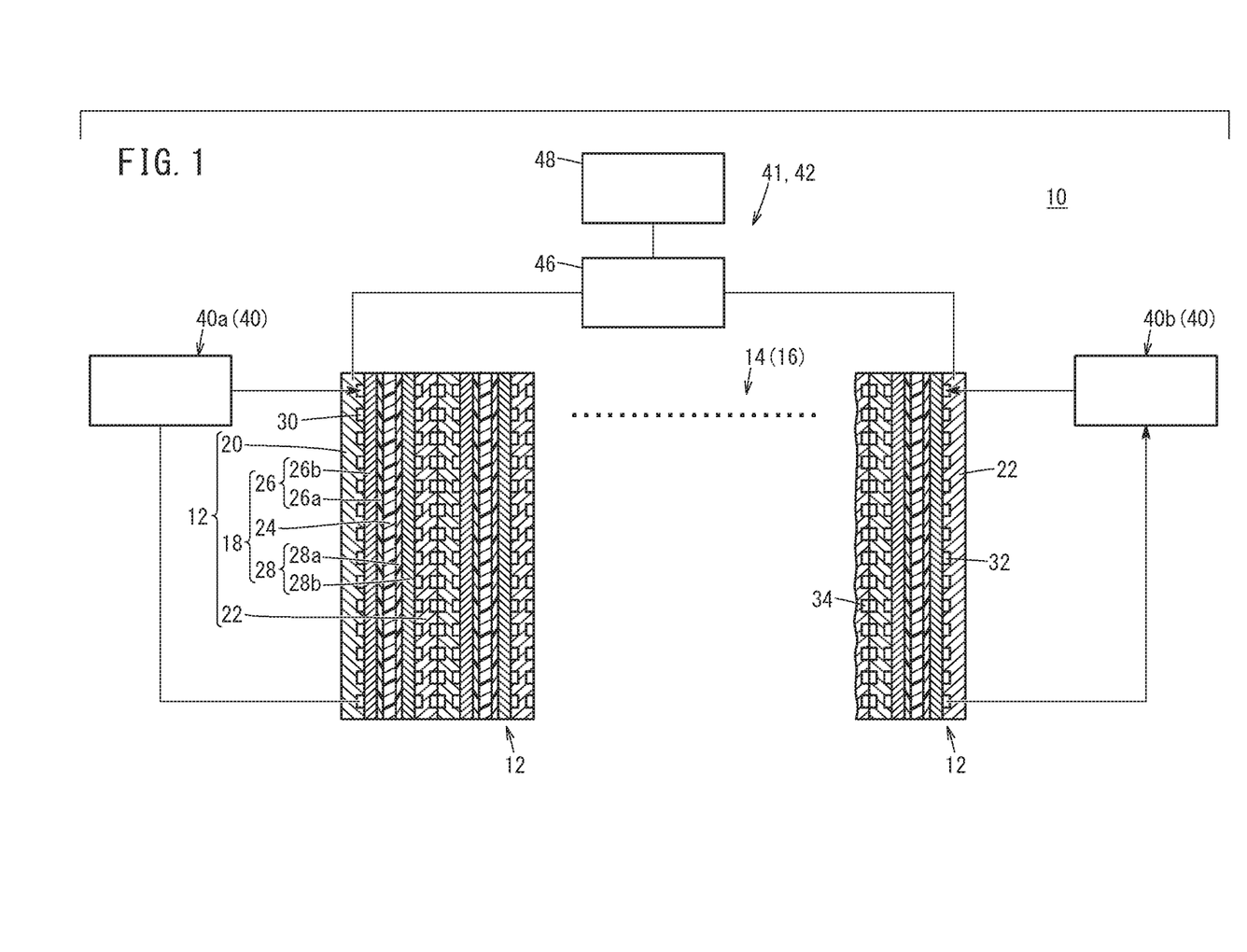
FIG. 1 is a diagram schematically showing structure of an output inspection apparatus for performing a method of inspecting output of a fuel cell according to an embodiment of the present invention.

The method of inspecting output of the fuel cell according to the embodiment of the present invention (hereinafter also simply referred to as the "output inspection method) can be performed using an output inspection apparatus 10 shown in FIG. 1. The output inspection apparatus 10 measures output of a fuel cell 16 in the form of a stack 14 formed by stacking a plurality of power generation cells 12 (unit fuel cells) together. The output inspection apparatus 10 can not only measure output of the fuel cell 16 in the form of the stack 14, but can also measure output of a fuel cell (not shown) in the form of a single power generation cell 12.

The power generation cell 12 is formed by sandwiching a membrane electrode assembly (MEA) 18 between a first separator 20 and a second separator 22. For example, the MEA 18 includes an electrolyte membrane 24, an anode 26 provided on one surface of the electrolyte membrane 24, and a cathode 28 provided on the other surface of the electrolyte membrane 24. The electrolyte membrane 24 is a thin membrane of polymer such as perfluorosulfonic acid.

The anode 26 is made of porous material including a first electrode catalyst layer 26a facing one surface of the electrolyte membrane 24, and a first gas diffusion layer 26b stacked on the first electrode catalyst layer 26a. The cathode 28 is made of porous material including a second electrode catalyst layer 28a facing the other surface of the electrolyte membrane 24, and a second gas diffusion layer 28b stacked on the second electrode catalyst layer 28a.

Each of the first electrode catalyst layer 26a and the second electrode catalyst layer 28a includes electrode catalyst supporting catalyst metal of platinum, etc. on a catalyst support of carbon such as carbon black, and an ion conductive polymer binder. It should be noted that the electrode catalyst may only comprise catalyst metal such as platinum black, and the electrode catalyst does not necessarily include the catalyst support.

In the case where the electrode catalyst comprises platinum, for example, the following electrode reaction occurs on the surface of the electrode catalyst:

The reduction potential of this electrode catalyst is about 0.75 V.

For example, each of the first gas diffusion layer 26b and the second gas diffusion layer 28b is made of porous material of a carbon paper, carbon cloth, etc. The first gas diffusion layer 26b is placed to face the first separator 20, and the second gas diffusion layer 28b is placed to face the second separator 22. For example, carbon separators are used as the first separator 20 and the second separator 22. Alternatively, metal separators may be used as the first separator 20 and the second separator 22.

The first separator 20 has a fuel gas flow field 30 on its surface facing the first gas diffusion layer 26b. The fuel gas flow field 30 is connected to a fuel gas supply passage (not shown) for supplying a fuel gas such as a hydrogen-containing gas, and a fuel gas discharge passage (not shown) for discharging the fuel gas.

The second separator 22 has an oxygen-containing gas flow field 32 on its surface facing the second gas diffusion layer 28b. The oxygen-containing gas flow field 32 is connected to an oxygen-containing gas supply passage (not shown) for supplying an oxygen-containing gas, and connected to an oxygen-containing gas discharge passage (not shown) for discharging the oxygen-containing gas.

When a plurality of the power generation cells 12 are stacked together, a coolant flow field 34 is formed between a surface of the first separator 20 and a surface of the second separator 22 which face each other. The coolant flow field 34 is connected to a coolant supply passage (not shown) for supplying a coolant and a coolant discharge passage (not shown) for discharging the coolant.

Next, the output inspection apparatus 10 will be described below. The output inspection apparatus 10 includes a gas supply unit 40, an energizing unit 41, and a voltage application unit 42 as main components. The gas supply unit 40 includes a first supply unit 40a for supplying an anode gas to the anode 26 through the fuel gas flow field 30, and a second supply unit 40b for supplying a cathode gas to the cathode 28 through the oxygen-containing gas flow field 32. Examples of the anode gas include the above fuel gas. Examples of the cathode gas include an inert gas such as nitrogen, the above oxygen-containing gas, and a mixed gas of the inert gas and the oxygen-containing gas.

The first supply unit 40a can regulate the flow rate of the anode gas supplied to the anode 26, and mix water vapor with the anode gas to regulate the dew point of the anode gas. Likewise, the second supply unit 40b can regulate the flow rate of the cathode gas supplied to the cathode 28, and mix water vapor with the cathode gas to regulate the dew point of the cathode gas. The first supply unit 40a and the second supply unit 40b may circulate the anode gas and the cathode gas to/from the stack 14, or supply the anode gas and the cathode gas to the stack 14 to flow internally (hermetically inside the stack 14), or flow along the stack 14 and discharge them to use them only once.

In the state where the anode gas is supplied to the anode 26 by the first supply unit 40a and the cathode gas is supplied to the cathode 28 by the second supply unit 40b, the energizing unit 41 electrically connects the anode 26 and the cathode 28 for energization between both electrodes (the anode 26 and the cathode 28). In this regard, the energizing unit 41 can regulate the magnitude of the electrical current applied between the anode 26 and the cathode 28 (hereinafter also referred to as the energizing current).

The voltage application unit 42 applies cyclic voltage which is increased and decreased within a predetermined range, to the stack 14 through the first separator 20 provided at one end of the stack 14 in the stacking direction and the second separator 22 provided at the other end of the stack 14 in the stacking direction. That is, the voltage application unit 42 can change the applied voltage over time, and repeat the changes over time under control which is similar to that of potential sweep in the cyclic voltammetry scheme.

For example, the energizing unit 41 and the voltage application unit 42 can be made up of a potentiostat/galvanostat (P/G stat) 46 which is capable of implementing current control and potential control between the electrodes, and a sweeper 48, etc., capable of changing the preset current and the preset potential of the P/G stat 46 over time.

Hereinafter, the output inspection method according to the embodiment of the present invention using the output inspection apparatus 10 will be described below. First, after the stack 14 is assembled, the stack 14 is set to the output inspection apparatus 10. Specifically, the energizing unit 41 and the voltage application unit 42 (P/G stat 46) are electrically connected to the stack 14. The first supply unit 40a is connected to the fuel gas flow field 30, and the second supply unit 40b is connected to the oxygen-containing gas flow field 32.

Next, an electric potential difference forming step is performed. In this electric potential difference forming step, the first supply unit 40a supplies a hydrogen gas to the anode 26, and the second supply unit 40b supplies an inert gas to the cathode 28. The hydrogen gas herein may be a pure hydrogen gas, or a gas containing hydrogen (hydrogen containing gas).

In this regard, preferably, the gas supply unit 40 is operated to allow at least one of the anode gas and the cathode gas to contain water vapor so as to prevent the electrolyte membrane 24 from being dried, for example. In this case, the temperature of the stack 14 and the dew points of the gases are regulated in order to achieve the balance where both of flooding in the stack 14 and drying of the electrolyte membrane 24 are suppressed. Flooding herein means, for example, the presence of excessive water in the liquid state in the stack 14 to a degree where supply of the gases is obstructed by the excessive water.

In the electric potential difference forming step, as described above, a hydrogen concentration difference between the anode 26 to which the hydrogen gas has been supplied and the cathode 28 to which the inert gas has been supplied is utilized to make it possible to generate an electric potential difference between the anode 26 and the cathode 28.

Next, after the electric potential difference between the anode 26 and the cathode 28 is generated as described above, a maintaining step is performed. In the maintaining step, the energizing unit 41 electrically connects, and energizes the anode 26 and the cathode 28, and maintains the voltage (electric potential difference) between the anode 26 and the cathode 28 at less than the reduction potential of the electrode catalyst.

That is, in the maintaining step, as the energizing unit 41, the P/G stat 46 implements current control between the anode 26 and the cathode 28. At this time, the energizing unit 41 implements current control by regulating the measurement current as the energizing current applied from the cathode 28 to the anode 26 to be smaller than the rated current. Therefore, for example, in the case where the rated current of the stack 14 is 1.00 A/cm$^2$, measurement current at 0.02 A/cm$^2$ which is 1/50 of the rated current is used as the energizing current applied to the cathode 28 and the anode 26.

Further, in the maintaining step, in the case where the electrode catalyst contains platinum, for example, the average cell potential of the cathode 28 is maintained at 0.1 V, less than the reduction potential (about 0.75 V) of the electrode catalyst. As a result, since it is possible to apply the reduction treatment to the electrode catalyst, it is possible to suppress or eliminate variation in the oxidation reduction state of the electrode catalyst.

Next, a measurement step is performed. In the measurement step, in the state where the measurement current as energizing current is applied to the anode 26 and the cathode 28, and voltage between the anode 26 and the cathode 28 is maintained at less than the reduction potential of the electrode catalyst, the cathode gas is changed to a mixed gas of the inert gas and an oxygen-containing gas. That is, the energizing unit 41 applies the measurement current as the energizing current to the anode 26 and the cathode 28. Further, the first supply unit 40a maintains the supply of the hydrogen gas. The second supply unit 40b changes the supply of the cathode gas from the inert gas to the mixed gas.

In this manner, power generation reactions can be induced at the anode 26 and the cathode 28. Therefore, the voltage between the anode 26 and the cathode 28 can be measured as the output of the stack 14. As described above, in the measurement step, the voltage measured by applying the measurement current which is smaller than the rated current, as the energizing current between the anode 26 and the cathode 28 can be obtained as the measurement result of the output of the stack 14. Further, since the mixed gas is supplied to the cathode 28, in comparison with the case where only the oxygen-containing gas is supplied to the cathode 28, it is possible to reduce the quantity of the hydrogen gas consumed in the power generation reaction.

Thanks to these advantages, it is not required to provide an apparatus in large scale or large quantities of the fuel gas, etc. for applying large energizing current which is as large as the rated current, to the anode 26 and the cathode 28. For this reason, with the simple structure, it becomes possible to perform output inspection of the stack 14 at low cost.

Further, since the cathode gas is used as the mixed gas, in comparison with the case where only the oxygen-containing gas is used as the cathode gas, it is possible to easily maintain the voltage between the anode 26 and the cathode 28 at less than the reduction potential of the electrode catalyst. As described above, since the measurement step is performed while maintaining the voltage between the anode 26 and the cathode 28 at less than the reduction potential of the electrode catalyst, it is possible to obtain the measurement result of the output of the fuel cell while variation in the oxidation reduction state of the electrode catalyst is kept reduced or eliminated by the electric potential difference forming step and the maintaining step.

Therefore, using the measuring current which is smaller than the rated current as the energizing current applied to the anode 26 and the cathode 28, even in the case where the voltage between the electrodes does not become small enough to eliminate variation in the oxidation reduction state of the electrode catalyst, it is possible to effectively suppress variation in the measurement results of the output of the stack 14. Consequently, it becomes possible to perform output inspection of the stack 14 at low cost and highly accurately.

Based on the obtained measurement results of the output, in the case of inspecting the quality of the stack 14, for example, the following method can be adopted. Specifically, using the stack of the same model as the stack 14, the relationship between the output obtained when the rated current is applied as energizing current and the output when the measurement current is applied as the energizing current is determined beforehand. An output having a level suitable for making determination of good quality when the rated current is applied as energizing current, is determined as a reference value. Corresponding to the reference value, an output obtained when the measurement current is applied as energizing current is determined as a determination value, using the relationship. Then, by comparing the measurement result of the stack 14 obtained in the measurement step and the determination value, it is possible to inspect the assembled stack 14 to determine whether the assembled stack 14 has good quality or bad quality.

The present invention is not limited especially to the above described embodiment. Various modifications can be made without deviating from the gist of the present invention.

For example, the output inspection method according to the embodiment of the present invention may include a voltage application step, after the electric potential difference forming step, and before the maintaining step. In the voltage application step, in the state where the electric potential difference between the anode 26 and the cathode 28 generated in the electric potential difference forming step is maintained, the cyclic voltage which is increased and decreased in a predetermined range is applied to the stack 14. The cyclic voltage has the minimum voltage which is less than the reduction voltage potential of the electrode catalyst.

That is, the P/G stat 46 as the voltage application unit 42 implements potential control between the anode 26 and the cathode 28. Therefore, in the case where the electrode catalyst contains platinum, the voltage application unit 42 applies the cyclic voltage to the stack 14, and the minimum value of the cyclic voltage is less than 0.75 V. In this regard, preferably, the voltage application unit 42 applies voltage in the range between 0.08 V and 1.00 V to the stack 14. By applying voltage of not less than 0.08 V, it becomes possible to repeatedly induce reactions where hydrogen is adsorbed on and desorbed from the electrode catalyst. Accordingly, it becomes possible to induce a reduction reaction of the surface of the electrode catalyst effectively to a greater extent. On the other hand, by applying voltage of not more than 1.00 V, even in the case where the electrode catalyst includes a carbon catalyst support, it becomes possible to avoid degradation of the catalyst support.

Further, in the case where the voltage applied to the stack 14 is increased from the minimum value to the maximum value and thereafter, decreased from the maximum value to the minimum value, and assuming that one cycle is made up of this operation, by repeating this cycle one or more times, it becomes possible to suitably apply reduction treatment to the electrode catalyst contained in the anode 26 and the cathode 28.

As described above, after reduction treatment is applied to the electrode catalyst by the voltage application step, voltage application is stopped, and the above maintaining step is performed. In this manner, it becomes possible to perform the measurement step after variation in the oxidation reduction state of the electrode catalyst has been suppressed or eliminated effectively to a greater extent. Consequently, it becomes possible to obtain the measurement result of the output of the stack 14 with a higher degree of accuracy.

EMBODIMENT EXAMPLES

Embodiment Example 1

A stack 14 was assembled by stacking ten power generation cells 12 each having an MEA 18 with an effective power generation area of 100 cm², and having electrode catalyst of platinum. Then, in order to allow the electrode catalyst contained in the anode 26 and the cathode 28 to have variation in the oxidation reduction state, the stack 14 was used for 10 hours, and then, set to the output inspection apparatus 10.

(1) Electric Potential Difference Forming Step

An electric potential difference forming step was performed for the above stack 14. In the electric potential difference forming step, for example, the temperature of the stack 14 was regulated to 80° C. by supplying a heat transmission medium having a regulated temperature to the coolant flow field 34 provided in the stack 14. Further, by the first supply unit 40*a*, a hydrogen gas (fuel gas) humidified to have the dew point of 75° C. was supplied to the anode 26 at the flow rate of 0.3 NL/min, and by the second supply unit 40*b*, a nitrogen gas (inert gas) humidified to have the dew point of 80° C. was supplied to the cathode 28 at the flow rate of 2.4 NL/min. In this manner, the hydrogen gas was supplied to the anode 26 and the inert gas was supplied to the cathode 28. Utilizing a hydrogen concentration difference between the anode 26 and the cathode 28, an electric potential difference was generated between the anode 26 and the cathode 28.

(2) Maintaining Step

In the manner as described above, by performing the electric potential difference forming step, after it was confirmed that the average cell potential of the cathode 28 became substantially constant at around 0.1 V, a maintaining step was performed. In the maintaining step, the temperature of the stack 14 and the supply of the anode gas and the cathode gas by the gas supply unit 40 were maintained under the same setting condition as the (1) electric potential difference forming step. Further, the anode 26 and the cathode 28 were electrically connected together by the energizing unit 41. At this time, measurement current at 0.002 A/cm² which is smaller than the rated current (1.00 A/cm²) was used as the energizing current. The voltage applied between the anode 26 and the cathode 28 was maintained at less than the reduction potential of the electrode catalyst.

An embodiment example of the stack 14 obtained by performing the maintaining step for 0.5 min. (maintaining time) will be referred to as the embodiment example 1-1. An embodiment example of the stack 14 obtained by performing the maintaining step for 1 min. (maintaining time) will be referred to as the embodiment example 1-2. An embodiment example of the stack 14 obtained by performing the maintaining step for 5 min. (maintaining time) will be referred to as the embodiment example 1-3. An embodiment example of the stack 14 obtained by performing the maintaining step for 10 min. (maintaining time) will be referred to as the embodiment example 1-4.

(3) Measurement Step

For each of the stacks 14 of the embodiment examples 1-1 to 1-4, the measurement step was performed. In the measurement step, the above measurement current was applied as the energizing current, and in the state where the voltage applied between the anode 26 and the cathode 28 was maintained at less than the reduction potential of the electrode catalyst, the cathode gas was changed to the mixed gas. That is, the temperature of the stack 14 was maintained at 80° C. by a temperature regulating unit 44. Further, by the first supply unit 40*a*, a hydrogen gas humidified to have the dew point of 80° C. was supplied to the anode 26 at the flow rate of 0.3 NL/min, and by the second supply unit 40*b*, the mixed gas of the air at the flow rate of 0.6 NL/min and the nitrogen gas at the flow rate of 1.8 NL/min humidified to have the dew point of 80° C. was supplied to the cathode 28.

In this manner, power generation reactions were induced at the anode 26 and the cathode 28, and after it was confirmed that the voltage applied between the anode 26 and the cathode 28 was stabilized, the voltage of each of the stacks 14 of the embodiment examples 1-1 to 1-4 was measured to obtain the measurement result of the output.

Figure 2:
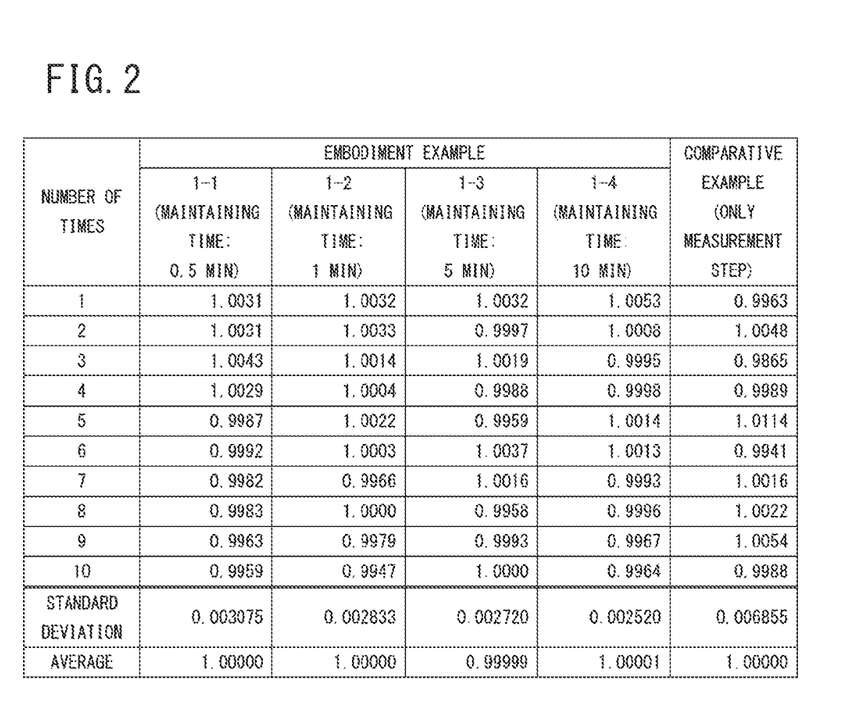
FIG. 2 is a table showing the ratio values relative to the average value, the standard deviation, and the average value of the ratio values of measurement results of 10 outputs in each of embodiment examples 1-1 to 1-4 and a comparative example.

For each of the stacks 14 of the embodiment examples 1-1 to 1-4, (1) the electric potential difference forming step, (2) the maintaining step, and (3) the measurement step were performed in combination, repeatedly 10 times, to obtain measurement results of 10 outputs. For each of the measurement results of the 10 outputs, the ratio value relative to the average value was determined, and is shown in FIG. 2. Further, the standard deviation of the measurement results of 10 outputs and the average value of the 10 ratio values are shown in FIG. 2 as well. It should be noted that the number of times shown in FIG. 2 is the number of repeating the combination of the reduction step and the measurement step.

Comparative Example

In a comparative example, only the (3) measurement step was performed without performing the (1) electric potential difference forming step and the (2) maintaining step. For the stack 14 of the comparative example, by repeating the (3) measurement step 10 times, measurement results of 10 outputs were obtained. In the same manner as in the cases of the embodiment examples 1-1 to 1-4, also in these measurement results of the 10 outputs, the ratio values relative to the average value, the standard deviation, and the average value of the ratio values were calculated, and are shown in FIG. 2 as well. Further, for ease of comparison, the standard deviation determined for each of the embodiment examples 1-1 to 1-4 and the comparative example is shown in a graph of FIG. 3. It should be noted that, in the measurement step, all of the average values of the measurement results of the outputs of the stacks 14 of the embodiment examples 1-1 to 1-4 and the comparative example were less than the reduction potential of the electrode catalyst (platinum) of 0.75 V.

Figure 3:
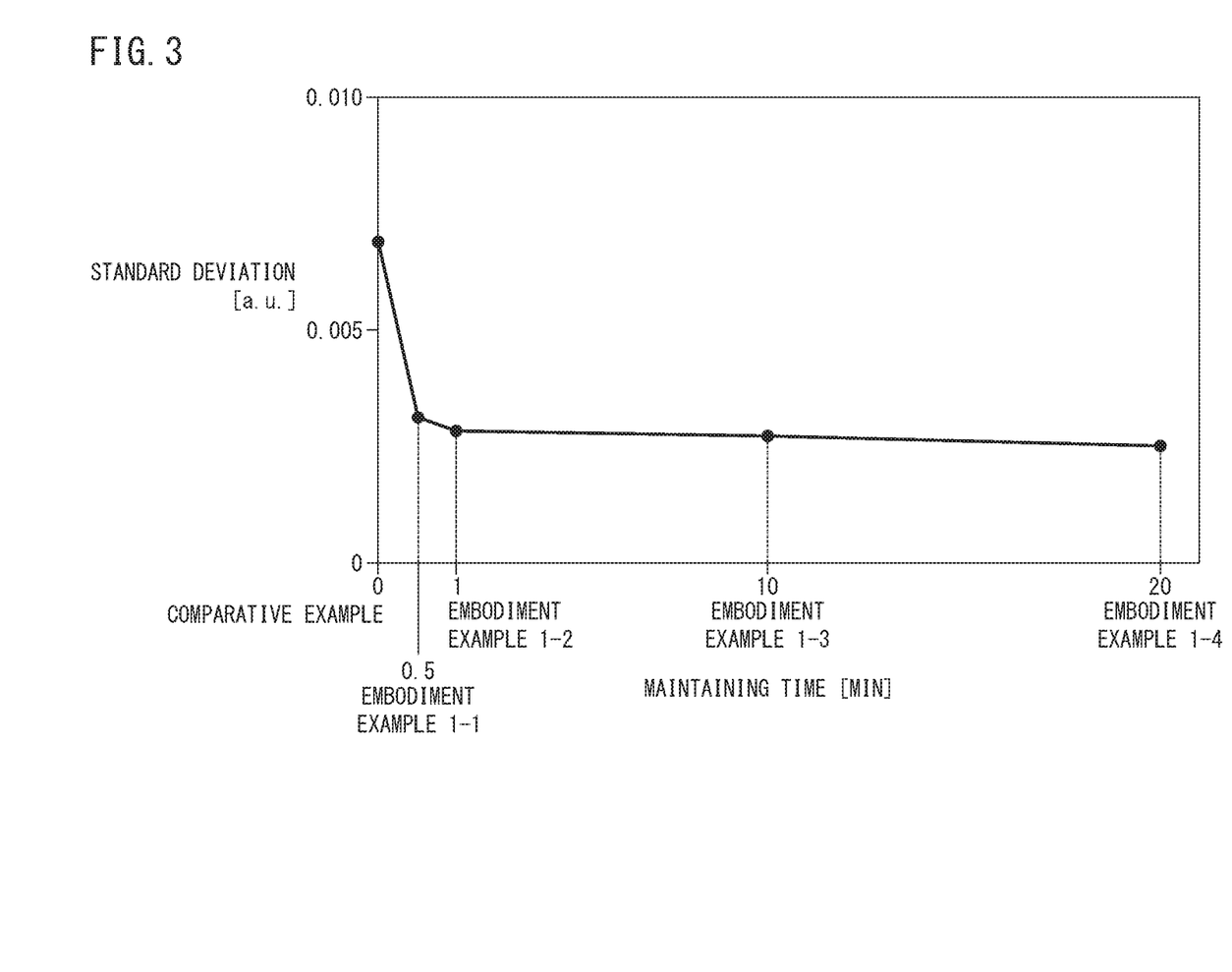
FIG. 3 is a graph showing the standard deviation in each of the embodiment examples 1-1 to 1-4 and the comparative example.

As shown in FIGS. 2 and 3, in the embodiment examples 1-1 to 1-4 where the measurement step was performed after the electric potential difference forming step and the maintaining step, in comparison with the comparative example where only the measurement step was performed, it is possible to reduce the standard deviation. Therefore, by performing the measurement step after variation in the oxidation reduction state of the electrode catalyst has been suppressed or eliminated by performing the electric potential difference forming step and the maintaining step, even if the energizing current applied between the anode 26 and the cathode 28 is smaller than the rated current in the measurement step, it is possible to suppress variation in the measurement results of the output. Accordingly, it is possible to obtain the measurement results of the output highly accurately, and it is not required to provide an apparatus in large scale or large quantities of the hydrogen gas, etc. for applying large energizing current which is as large as the rated current, to the anode 26 and the cathode 28. For this reason, with the simple structure, it is possible to perform output inspection of the stack 14 at low cost.

Embodiment Example 2

The voltage application step was performed after the (1) electric potential difference forming step. Specifically, in the voltage application step, the temperature of the stack 14 and the supply of the anode gas and the cathode gas by the gas supply unit 40 were maintained under the same setting condition as the (1) electric potential difference forming step. Then, after it was confirmed that the average cell potential of the cathode 28 became substantially constant at around 0.10 V, the cyclic voltage which is increased and decreased in the range between 0.08 V and 1.00 V was applied to the stack 14 by the voltage application unit 42 to apply reduction treatment to the electrode catalyst.

At this time, the voltage was increased from 0.08 V to 1.00 V over a period of 45 seconds. Thereafter, the voltage was decreased from 1.00 V to 0.08 V over a period of 45 seconds. One cycle is made up of these periods. An embodiment example of the stack 14 obtained by performing the reduction step where the number of cycles is 1 (one) will be referred to as the embodiment example 2-1. An embodiment example of the stack 14 obtained by performing the reduction step where the number of cycles is 2 (two) will be referred to as the embodiment example 2-2. An embodiment example of the stack 14 obtained by performing the reduction step where the number of cycles is 3 (three) will be referred to as the embodiment example 2-3. An embodiment example of the stack 14 obtained by performing the reduction step where the number of cycles is 4 (four) will be referred to as the embodiment example 2-4. An embodiment example of the stack 14 obtained by performing the reduction step where the number of cycles is 5 (five) will be referred to as the embodiment example 2-5.

Figure 4:
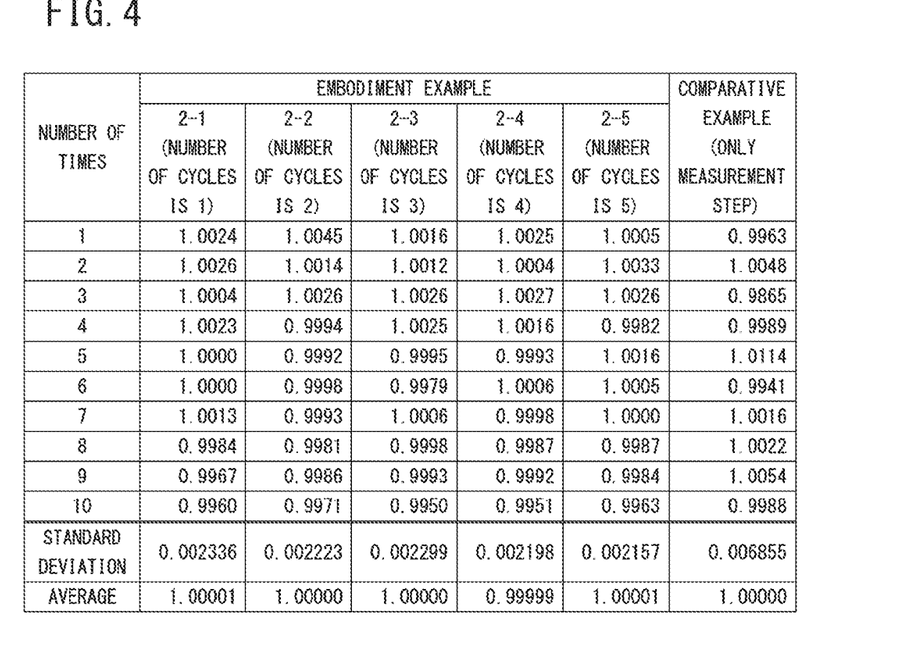
FIG. 4 is a table showing the ratio values relative to the average value, the standard deviation, and the average value of the ratio values of measurement results of 10 outputs in each of embodiment examples 2-1 to 2-5 and the comparative example.

For each of the stacks 14 of the embodiment examples 2-1 to 2-5, the (2) maintaining step was performed for 0.25 min. (maintaining time), and thereafter, the (3) measurement step was performed, and measurement results of the outputs of the embodiment examples 2-1 to 2-5 were obtained, respectively. Also in the measurement results of the outputs of the embodiment examples 2-1 to 2-5, in the same manner as in the cases of the embodiment examples 1-1 to 1-4, the ratio values relative to the average value, the standard deviation, and the average value of the ratio values were calculated, and are shown in FIG. 4 as well. Further, for comparison, the ratio values relative to the average value, the standard deviation, and the average value of the ratio values determined for the comparative example are shown in FIG. 4 as well. Further, for ease of comparison, the standard deviation determined for each of the embodiment examples 2-1 to 2-5 and the comparative example is shown in a graph of FIG. 5. It should be noted that, all of the measurement results of the outputs of the stacks 14 of the embodiment examples 2-1 to 2-5 were less than the reduction potential of the electrode catalyst (platinum) of 0.75 V.

Figure 5:
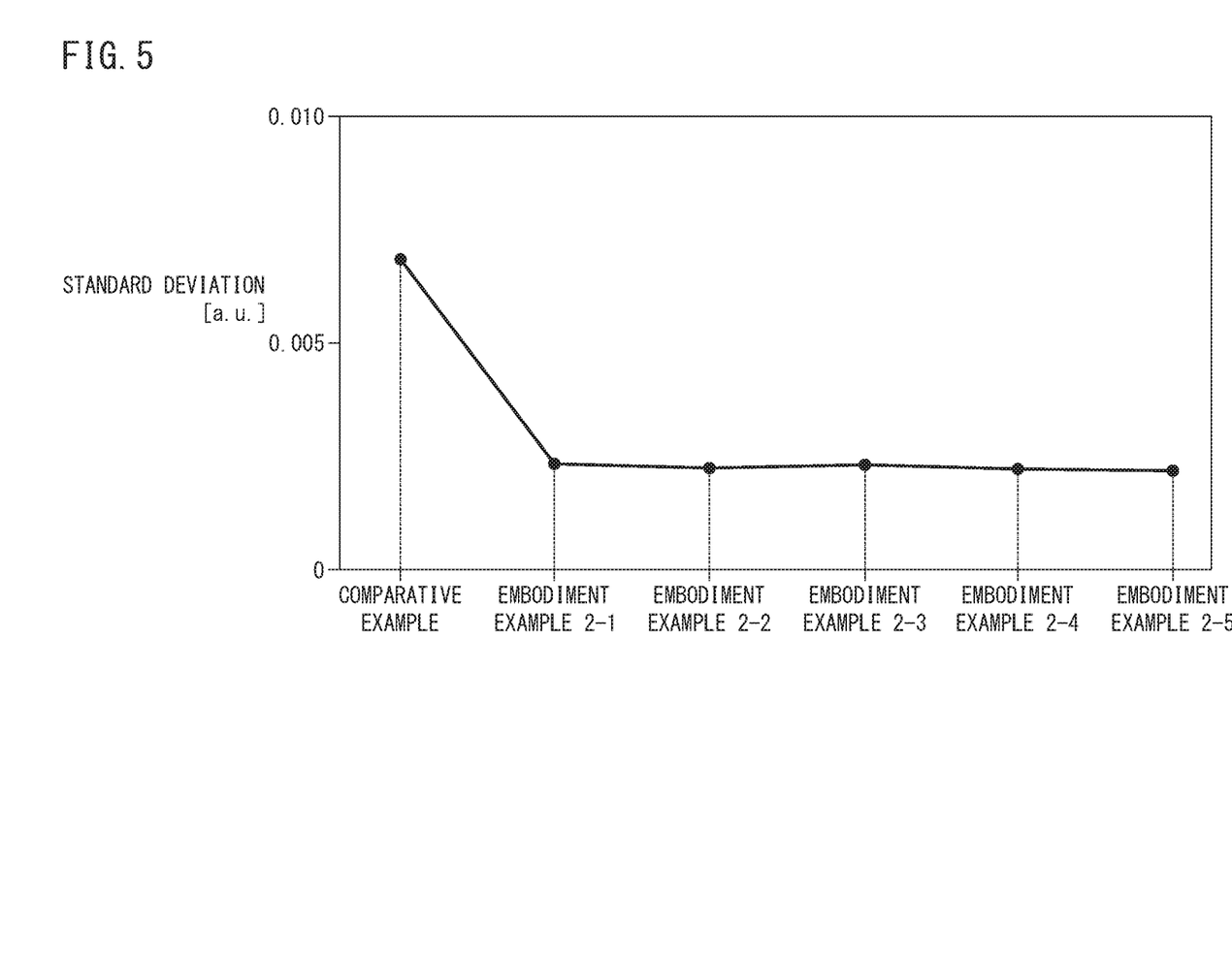
FIG. 5 is a graph showing the standard deviation in each of the embodiment examples 2-1 to 2-5 and the comparative example.

As shown in FIGS. 4 and 5, in the embodiment examples 2-1 to 2-5 where the measurement step was performed after the electric potential difference forming step, the voltage application step, and the maintaining step, in comparison with the comparative example where only the measurement step was performed, it is possible to reduce the standard deviation. Therefore, because the measurement step is performed after variation in the oxidation reduction state of the electrode catalyst has been suppressed or eliminated by performing the electric potential difference forming step, the voltage application step, and the maintaining step, it is possible to obtain the measurement results of the output highly accurately, and with the simple structure, it is possible to perform output inspection of the stack 14 at low cost.

Further, it was found from FIGS. 2 to 5 that, in the embodiment examples 2-1 to 2-5 where the voltage application step was performed between the electric potential difference forming step and the maintaining step, it is possible to reduce the standard deviation to a greater extent, in comparison with the embodiment examples 1-1 to 1-3 where no voltage application step was performed. Therefore, it is possible to perform the measurement step after variation in the oxidation reduction state of the electrode catalyst has been suppressed effectively by performing the voltage application step, and consequently, it becomes possible to perform output inspection of the stack 14 with a higher degree of accuracy.

What is claimed is:

1. A method of inspecting output of a fuel cell, the fuel cell comprising an electrolyte membrane of solid polymer, an anode provided on one surface of the electrolyte membrane, and a cathode provided on another surface of the electrolyte membrane, the anode and the cathode each including electrode catalyst, the method comprising:

an electric potential difference forming step of generating an electric potential difference between the anode and the cathode by supplying a hydrogen gas as an anode gas to the anode and supplying an inert gas as a cathode gas to the cathode;

a maintaining step of applying measurement current which is smaller than rated current of the fuel cell, to the anode and the cathode having the electric potential difference, and maintaining voltage between the anode and the cathode at less than a reduction potential of the electrode catalyst; and a measurement step of, in a state where the measurement current is applied to the anode and the cathode, and voltage between the anode and the cathode is maintained at less than the reduction potential of the electrode catalyst, changing the cathode gas supplied to the cathode to a mixed gas of the inert gas and an oxygen-containing gas, and thereafter, measuring output of the fuel cell.

2. The method of inspecting output of the fuel cell according to claim 1, further comprising a voltage application step of applying cyclic voltage to the fuel cell after the electric potential difference forming step and before the maintaining step, in a state where the electric potential difference is generated between the cathode and the anode, the cyclic voltage being increased and decreased within a predetermined range having a minimum voltage less than the reduction potential of the electrode catalyst, wherein the maintaining step is performed after stopping application of the voltage in the voltage application step.

* * * * *